United States Patent [19]
Thaler

[11] 3,827,300
[45] Aug. 6, 1974

[54] LEVEL SENSING DEVICE WITH CAPACITIVE GAGING TRANSDUCER

[76] Inventor: Sherwood S. Thaler, 45 Circle Rd., Lexington, Mass. 02173

[22] Filed: Jan. 12, 1973

[21] Appl. No.: 323,023

Related U.S. Application Data

[63] Continuation of Ser. No. 59,965, July 31, 1970, abandoned.

[52] U.S. Cl............ 73/304 C, 317/246, 324/61 R, 324/61 R
[51] Int. Cl.................... G01r 23/26, H01g 5/20
[58] Field of Search.................. 73/304 C; 317/246

[56] References Cited
UNITED STATES PATENTS

| | | | |
|---|---|---|---|
| 2,357,023 | 8/1944 | Reid | 73/304 C |
| 2,752,543 | 6/1956 | Smith | 73/304 C X |
| 2,849,882 | 9/1958 | Lee | 73/304 C |
| 2,998,559 | 8/1961 | Smith | 73/304 C X |
| 3,010,320 | 11/1961 | Sollecito | 73/304 C |
| 3,279,253 | 10/1966 | Blackmon et al. | 73/304 C |
| 3,377,861 | 4/1968 | Thaler et al. | 73/304 C |
| 3,439,539 | 4/1969 | Pallis | 73/301 |
| 3,463,980 | 8/1969 | Cohn et al. | 73/304 C X |
| R24,082 | 11/1955 | Smith | 317/246 |

Primary Examiner—Richard C. Queisser
Assistant Examiner—Frederick Shoon
Attorney, Agent, or Firm—Harry A. Herbert, Jr.; Sherman H. Goldman

[57] ABSTRACT

A fuel level measuring system with gaging transducers in the form of probes having an outer, capacitive element and an inner, profiled element which may be continuous, representing an infinite number of capacitive plates, or divided into discrete plates whereby a single probe, operating as a three dimensional probe, performs the function of a multiplicity of probes for various attitudes of a vehicle. An attitude-responsive switch may be used to selectively energize distinct plates of the element.

14 Claims, 13 Drawing Figures

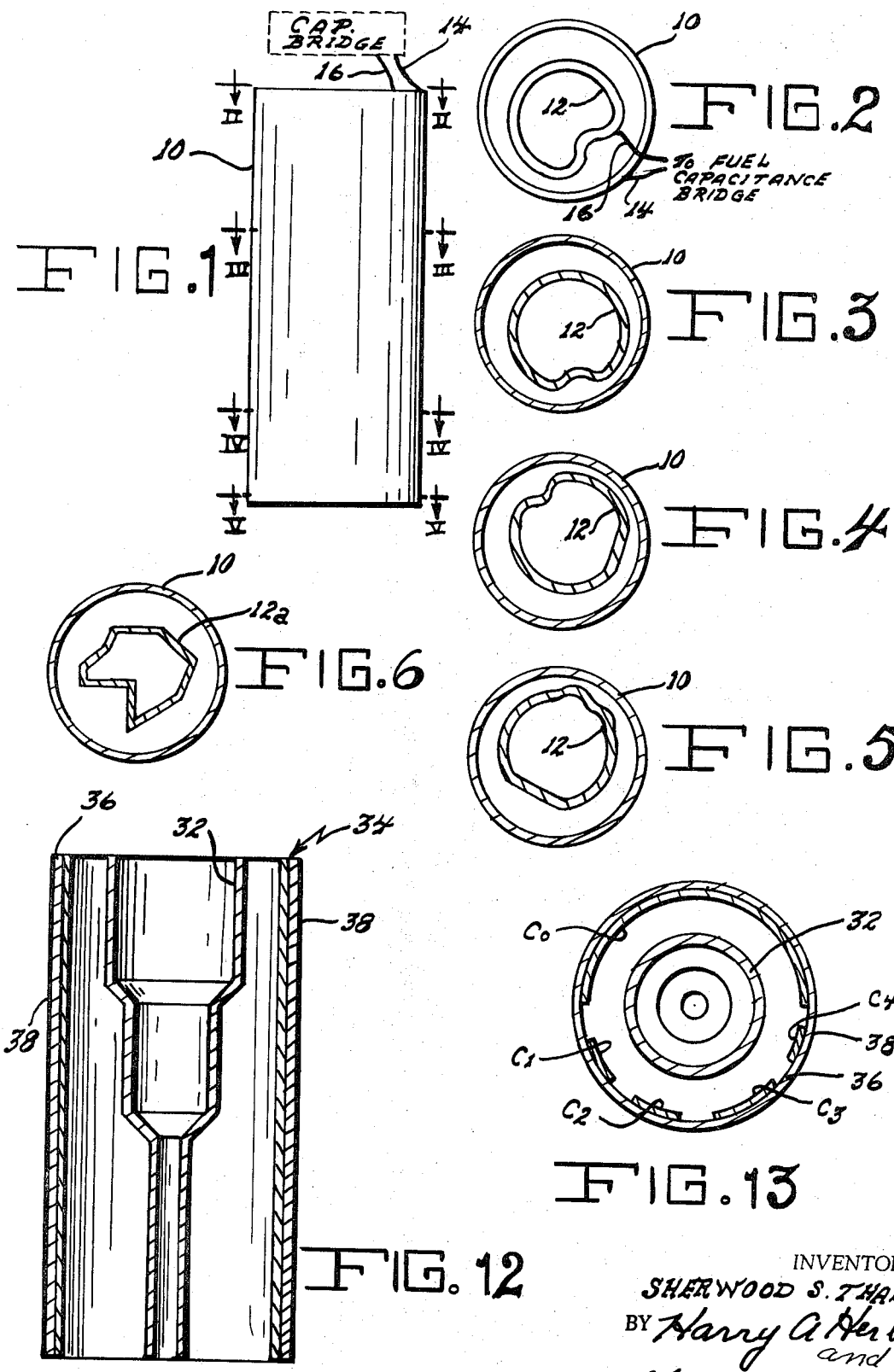

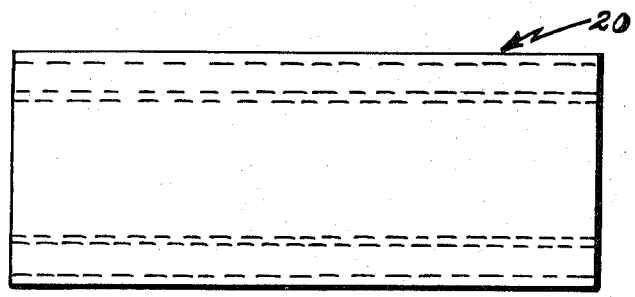
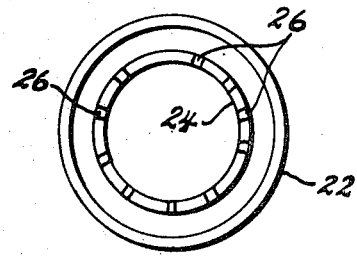
FIG. 7   FIG. 8
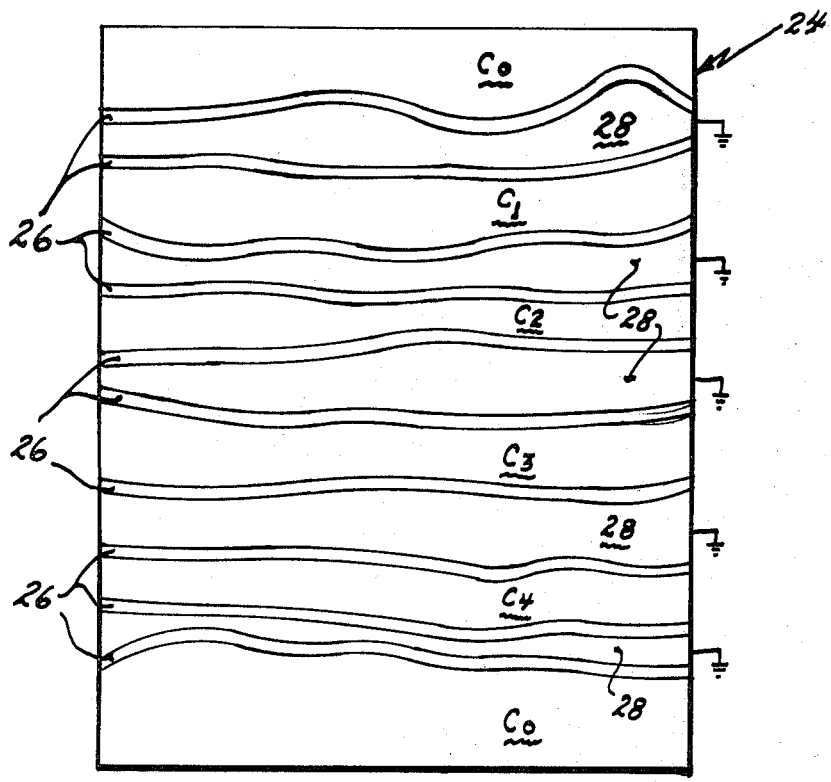
FIG. 9

LEVEL SENSING DEVICE WITH CAPACITIVE GAGING TRANSDUCER

This invention is a continuation of application Ser. No. 59,965 filed July 31, 1970, and now abandoned.

BACKGROUND OF THE INVENTION

This invention relates generally to fuel gaging systems and more particularly to a fuel gaging system utilizing capacitance sensors of three dimensional profiling characteristics. The prior art probes required an excessive number of probes in order to obtain a desired degree of accuracy for various aircraft attitudes. For example, utilizing conventional probes, the Concorde SST preliminary design required in excess of 140 probes due to the irregular shape of the gasoline containers, the various attitudes to be encountered and the rigid degree of accuracy. Thus, with a 1 to 2 pound weight per probe, there would be imposed excessive weight to the aircraft for the function to be performed. Utilization of the probes of this invention would provide an elimination of a significant portion of the weight by decreasing the number of probes without affecting accuracy. The older type probes, which either had an all metal step capacitor type structure or a generally cylindrical capacitor structure which utilized profiled electroplating, all had a disadvantage of using only a small percentage of their azimuthal dimension to perform their function. For example, a 10 percent wedge would be all that would be needed electrically since the probes operate as two dimensional probes.

Error free gaging over a wide span of vehicle attitudes, which is required for modern aircraft, would require an infinite number of the prior art probes to cover the infinite number of attitudes to be covered. Generally, under present day fuel gaging technology a known level of attitude error is tolerated with the system, and locations of probes are chosen according to the skill of the designer and checked by computer. Although an infinite number of probes in a fuel tank utilizing conventional probes is impossible of performance, this invention provides compact structures which enables the effective accomplishment of the desired end by utilizing gaging transducers operating as three dimensional probes.

SUMMARY OF THE INVENTION

The problems of the prior art of requiring a large number of probes with the attendant economic and weight disadvantages has been solved by providing a three dimensional probe which is of large diameter to replace a series of older type probes. Additional, smaller diameter embodiments of applicant's invention provide a finite number of discrete probes within a single probe structure.

Accordingly, it is a primary object of this invention to provide gaging transducers for use in fuel gaging systems which improve gage system accuracy over varying attitudes.

It is another object of this invention to provide an improved fuel gaging system which reduces cost and weight and provides reduced maintenance time for all attitude vehicles.

It is still another object of this invention to provide a single, relativly large gaging transducer which is capable of acting in the manner of an infinite number of probes.

It is a further object of this invention to provide a fuel gaging transducer which combines a number of probes in a single compact structure.

It is a still further object of this invention to provide a capacity sensor utilized as a gaging transducer which has three dimensional profiling characteristics.

Another object of this invention is to provide a capacitance probe for fuel gaging which is comprised of discrete segments.

BRIEF DESCRIPTION OF THE DRAWINGS

FIG. 1 is a view, partly in schematic form, of a fuel gaging transducer;

FIGS. 2, 3, 4 and 5 are views taken along lines II—II, III—III, IV—IV and V—V, respectively;

FIG. 6 is a cross section of an alternative embodiment;

FIGS. 7 and 8 are a front and end view of a discrete segment capacitive transducer;

FIG. 9 is a view of the inner element of the transducer in an unfurled condition;

FIG. 12 is a front view in cross section of an alternative embodiment of the invention; and FIG. 13 is an end view of the embodiment of FIG. 12.

DESCRIPTION OF THE PREFERRED EMBODIMENTS

Figure 11:
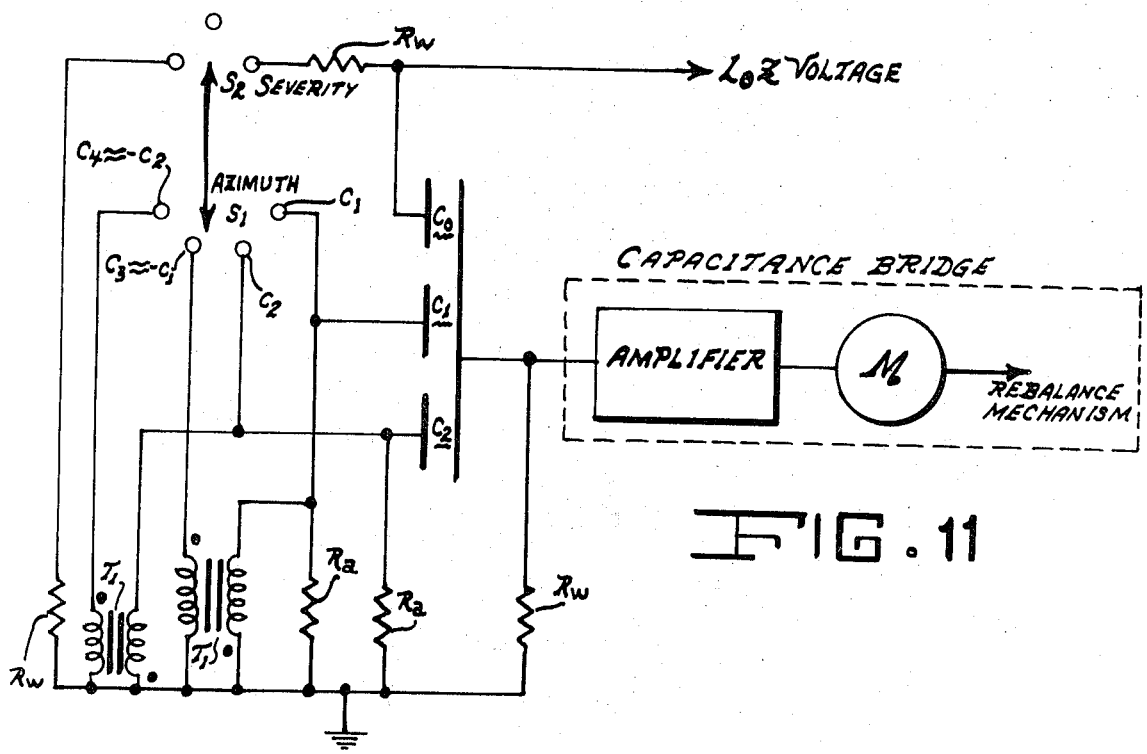
FIGS. 10 and 11 are schematic representations of circuitry to provide the measurement function.

Since each attitude of conventional probes require a separate probe, the three dimensional, all metal embodiment of FIGS. 1 through 5 has been designed in order to yield perfect gaging for single valued tankage designs. The reason for the yielding of error-free gaging over a large span of attitudes is that the single probe may be considered to be a large number of separate probes arranged circumferentially. In FIGS. 1 through 5, 10 represents the low impedance outer plate of the transducer and is made of a relatively large diameter (in the order of about 6 inches) compared to conventional probes. The size is such that the inner, high impedance plate 12 must be large enough so that diametrically opposed segments will be exposed to measurably different heights of liquid with relatively small changes of attitude. Although a circular, cylindrical configuration is shown, other geometry may be utilized, e.g., a T-shaped structural member of the wing forming the tank might be deemed desirable.

The design of the inner high impedance plate 12 is computer profiled, as is conventional in the art, and is illustrated most clearly in FIGS. 2 through 5 to show that the inner plate is continuous, noncircular and nonconcentric. Since FIGS. 2 through 5 are illustrative only, the specific pattern configuration would be profiled to correspond to a particular tank geometry. Vehicle attitude and the level of fuel produce various covered heights around the periphery of the probe to provide a capacitance versus height function which may be measured to provide the quantity of fuel. Where the attitude is other than horizontal, separate vertical segments of the probe may be determined each to have the capacitance versus height function which is summed to determine fuel quantity. The large size in effect places each segment in a different part of the tank with measurably different liquid levels for small attitude changes.

The probe would be conventionally mounted and leads 14 and 16, illustrated in FIGS. 1 and 2, would be connected to a capacitance bridge to obtain a fuel weight function of capacitance. Because of the large diameter of the probe there is obtained a height differential across the probe for various attitudes. Thus, the summing of the capacitance of each incremental segment to represent the total capacitance would be functionally translated into pounds of fuel.

As illustrated in FIG. 6 the large area probe could have a homogeneous high impedance plate 12a which is discretely profiled. This embodiment could be used where the required tank geometry and accuracy do not require the continuous profiling, thereby rendering manufacture of the probe more simplified.

Figure 10:
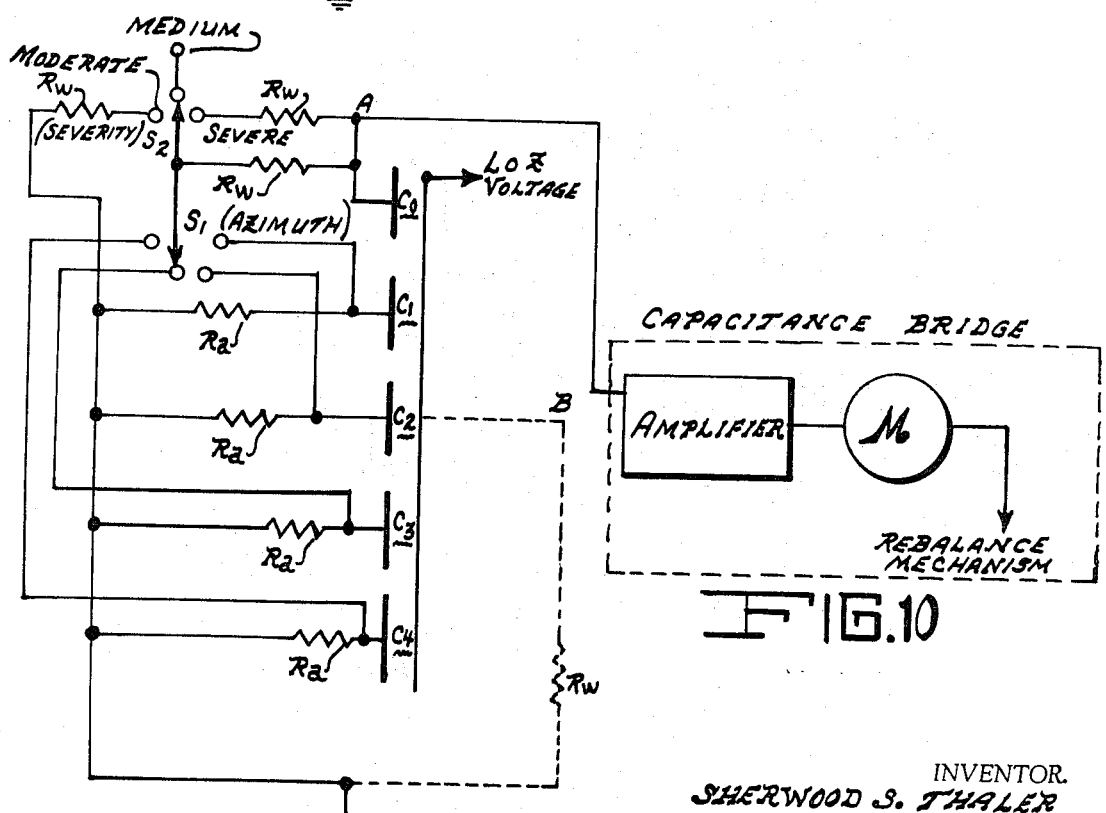

Since the foregoing discussion relates to single valued tanks, those tanks that require a separate probe to cover the existence of fuel pockets and overlap (continuity) considerations dictate the requirement for additional probes. Thus, additional three dimensional probes or conventional probes may also be utilized so that more than one probe will be at least partly covered.

Where a determination has been made that a smaller number of segments and, therefore, a smaller probe than that of FIGS. 1 through 5 would provide the required accuracy, the embodiment of FIGS. 7 through 9 may be utilized in conjunction with the circuitry of FIG. 10. The probe 20 in this instance has concentric cylinders forming the plates of the capacitor. The low impedance, outer plate is represented by numeral 22 while the inner plate 24 combines the function of the high impedance plates and ground. FIG. 9 is an illustration of the unfurled inner plate 24 which comprises a series of high impedance areas labeled $C_0$, $C_1$, $C_2$, $C_3$ and $C_4$ which are separated by insulating gaps or strips 26 and ground strips 28.

Thus, when the element 24 of FIG. 9 is furled to form the embodiment of FIGS. 7 and 8, the four elements $C_1 - C_4$ of the discrete segment type probes would be fed to a make-before-break azimuth, attitude activated switch $S_1$ (see FIG. 10) which may be of the pendulum type or of a free moving bubble of mercury traveling over a profiled switch section as is well known in the art. Switch $S_2$ is similar in form to that of $S_1$ and is provided to take into accound the severity of attitude tilt from a reference attitude. Any conventional capacitance bridge circuit may be utilized; however, as schematically depicted, a bridge circuit having a rebalance system is provided to receive inputs from capacitor $C_0$ and some of the remaining capacitor segments, depending upon the position of attitude activated switches $S_1$ and $S_2$. It should be noted that with normal designs, $C_0$ will require a correction of 5–10 percent for the span of attitudes under consideration to provide the total fuel capacity which may be read from the self-balancing capacity bridge. The make-before-break feature of severity switch $S_2$ provides a three step attenuation factor for moderate, medium and severe attitude angles. At the border region between adjacent switch segments, the attenuation factor is averaged providing a vernier effect. Each of the capacitors $C_1 - C_4$ has a summing or averaging resistor $R_a$ connected from the capacitor to ground. Weighting of multiplier resistors $R_w$ are also provided to aid in calibration of the device.

The circuit of FIG. 10, as thus far described, pertains to systems wherein the common outer terminal of the capacitor is the low impedance plate. Where the common terminal is the inner, high impedance plate, the $L_o$ Z voltage would be applied to point A on the schematic and the amplifier removed from this point and applied to point B. Additionally, the circuit components in dashed lines would be added.

FIG. 11 is illustrative of a circuit wherein the inner common terminal is the high impedance plate. This circuit could be modified in the same manner as FIG. 10 to accommodate a common, low impedance outer plate. The circuitry of FIG. 10 utilizes phase reversing transformers $T_1$ and can reduce up to 50 percent the number of attitude profiles. If, in the embodiments thus far described, an application should result in $C_3 \approx -C_1$ and $C_4 \approx -C_4$, the transformers $T_1$ would be used to generate each negative function, thereby eliminating a probe segment for each function generated.

A probe modification illustrating a discrete, outer, low impedance terminal and a common inner, high impedance terminal is found in FIGS. 12 and 13. In this embodiment the inner, all metal, high impedance terminal 32 is profiled and constructed in accordance with present practices. The outer element 34, the low impedance plate, is constructed on an insulating base 36 36 such as Fiberglas and has a continuous outer conductive coating 38 to shield the inner structure from stray electrostatic fields. The shield may be eliminated if stray fields are not a problem with a particular installation. The inner surface of the insulating base 36 has plated thereon segments 40, which in actuality are low impedance sections of the capacitor. The larger element forms the section $C_0$ while the remainder provide $C_1$ through $C_4$. This embodiment eliminates the ground connection and does not suffer from ground leakage problems. Leakage across the Fiberglas, because of the relatively high capacitance, would cause a quadrature current rather than an in phase current thereby minimizing a leakage problem. Because the structure results in no appreciable high impedance plate-to-ground capacitance, it is compatible with conventional mass compensation or full height compensation systems.

Although the invention has been described relative to particular embodiments, it should be understood to those skilled in the art that the invention is capable of a variety of alternative embodiments. For example, with regard to FIGS. 12 and 13, the inner metal element could be eliminated and the profiling elements located upon the outer surface. Thus, the resulting capacitance would be employed as the series capacitance for a full height compensation design.

I claim:

1. A capacitance type fluid gaging transducer for determining the level and quantity of a dielectric, liquid fluid for various attitudes of a container, said transducer having a longitudinal axis and comprising, a multiplicity of profiled electrical probe sections arranged around said longitudinal axis, each of said multiplicity of probe sections acting as a separate probe and comprising a pair of spaced, capacitive elements which coextend in the direction of said longitudinal axis, one of said capacitive elements of each probe section being common to all of said multiplicity of probe sections and forming a continuous surface around said axis, one of said elements of each pair of capacitive elements being profiled to provide a capacitance which varies as a reflection of container geometry in a direction along said axis such that its coaction with the other capacitive element of its pair of capacitive elements provides an output capacitance having a relation to the dielectric fluid level between the capacitive elements of each probe section, and the total capacitance of selected probe sections has a monotonic relation to the fluid quantity, and opposed probe sections are so spaced as to cause the cross sectional size of the transducer to be such as to allow for measurably different liquid fluid levels at opposed probe sections for relevant attitude changes of the fluid container.

2. A transducer as defined in claim 1 wherein said multiplicity of probe sections around said axis merge to form a single, large probe which acts as a multiplicity of probes, said merger being attained by having elements of said probe sections, which coact with said common surface, made contiguous to form a second continuous surface around said axis.

3. A transducer as defined in claim 2 wherein said profiled elements forming one of said continuous surfaces produces its variance of capacitance continuously by variation of the spacing with respect to the other of said surfaces.

4. A transducer as defined in claim 2 wherein said profiled elements forming one of said continuous surfaces results in said one of said surfaces being discretely profiled.

5. A transducer as defined in claim 2 wherein said continuous surfaces are connected to a capacitance bridge.

6. A transducer as defined in claim 1 wherein the profiled capacitive element of each probe is area profiled, physically discrete and insulated from other profiled capacitive elements.

7. A transducer as defined in claim 6 including grounding strips located between adjacent, profiled capacitive elements and insulated from said profiled, capacitive elements.

8. A transducer as defined in claim 1 including means for selectively connecting some of said pairs of capacitive elements to a capacitance type bridge circuit for measuring the total capacitance of the connected pairs of capacitive elements, thereby measuring the liquid fluid in said container.

9. A transducer as defined in claim 1 wherein said capacitive elements forming said continuous surface are the capacitive elements that are profiled.

10. A transducer as defined in claim 1 wherein said continuous surface is within the other elements of said pair of elements of each probe section.

11. A transducer as defined in claim 10 including a shield surrounding said multiplicity of probes.

12. A transducer as defined in claim 1 wherein said continuous surface surrounds said profiled elements.

13. A capacitance type fluid gaging transducer comprising, a single probe structure having a multiplicity of profiled electrical probes as a part thereof, and an attitude activated switch connected with said electrical probes for selecting predetermined profiled probes for selected attitudes.

14. A capacitance type fluid gaging transducer for determining the level and quantity of a dielectric, liquid fluid for various attitudes of a container, said transducer having a longitudinal axis and comprising, a pair of plates in spaced relation one to another, said plates being shaped to form continuous surfaces around said longitudinal axis and being profiled in a direction along said longitudinal axis by varying the spacing between said plates as a reflection of container geometry such that the capacitance of portions of said pairs of plates around said longitudinal axis varies in the longitudinal direction in relation to the dielectric fluid level of that portion, and the total capacitance of all the portions has a monotonic relation to the fluid quantity, and the cross sectional size of the transducer is such as to allow for measurably different liquid fluid levels at opposed portions for relevant attitude changes of the fluid container.

* * * * *